United States Patent Office.

JOHN S. LIPPS, OF BROOKLYN, NEW YORK, ASSIGNOR TO HIMSELF AND EDWIN SANDERSON, OF NEW YORK CITY.

Letters Patent No. 60,755, dated January 1, 1867.

IMPROVED COMPOSITION OF MATTER FOR FUEL AND OTHER PURPOSES.

The Schedule referred to in these Letters Patent and making part of the same.

TO ALL WHOM IT MAY CONCERN:

Be it known that I, JOHN S. LIPPS, of Brooklyn, in the county of Kings, and State of New York, have invented or discovered a certain new and useful Composition applicable as Artificial Fuel, and as a non-conductor of heat for steam boilers and other purposes, of which the following is a full, clear, and exact description of the manner in which the same is or may be compounded.

My invention consists in a certain admixture of coal-dust, either anthracite or bituminous, or charcoal or coke, and dextrine, with pitch reduced to a powder. For an artificial fuel I take powdered or fine coal-dust in preference to charcoal or coke, say one ton of two thousand (2,000) pounds, mixed with twenty-five (25) pounds, more or less, of pitch reduced to a fine powder and sifted. To these, when well mixed, add a solution of about five (5) pounds of dextrine in about fifteen (15) gallons of water, and mix the whole well, so as to bring the same into a plastic mass, when I press it into bricks, lumps, or cakes of the desired form, and first dry by exposure to the atmosphere and afterwards bake by subjecting the mass to a strong heat of, say 300° Fahrenheit. The powdered pitch, unlike tar or other equivalent fluid, readily and thoroughly mixes with the coal-dust, and being melted by the baking, causes a perfect adhesion of the particles of coal-dust, while the dextrine, which has held the particles together until the melting of the pitch, carbonizing at the temperature specified, becomes in a measure water-proof, so that it is little affected by rain or other moisture. Thus it will be understood that in the manufacture, the dextrine and powdered pitch separately act to produce like results during the process of manufacture, viz, to hold the particles of coal together, while both afterwards serve, in combination with the coal-dust, to produce a firm, inflammable, and advantageous fuel. In the manufacture of cement, as a non-conductor of heat for coating steam boilers, steam pipes, and for other purposes, it may be preferable to use powdered charcoal or coke in place of coal-dust, and the proportions of dextrine and pitch be more or less varied, according to the purpose the plastic mass so produced is designed to be used for.

What I claim as my invention, and desire to secure by Letters Patent, is—

The composition of matter substantially as herein described, and composed of coal, coke, or charcoal-dust, admixed with dextrine and powdered pitch, and baked, essentially as herein set forth.

JOHN S. LIPPS.

Witnesses:
J. W. COOMBS,
G. W. REED.